United States Patent [19]

Smith et al.

[11] Patent Number: 5,094,890

[45] Date of Patent: Mar. 10, 1992

[54] WOOD TREATMENT COMPOSITION AND PROCESS

[75] Inventors: Kevin M. Smith; David H. Condlyffe, both of Bromsgrove, England

[73] Assignee: Albright & Wilson Limited, Warley, England

[21] Appl. No.: 561,280

[22] Filed: Aug. 1, 1990

Related U.S. Application Data

[63] Continuation of Ser. No. 426,534, Oct. 24, 1989, abandoned, which is a continuation of Ser. No. 320,862, Mar. 6, 1989, abandoned, which is a continuation of Ser. No. 150,015, Jan. 29, 1988, abandoned.

[30] Foreign Application Priority Data

Jan. 30, 1987 [GB] United Kingdom ............... 8702055

[51] Int. Cl.$^5$ .............................................. B05D 3/02
[52] U.S. Cl. ....................................... 427/393; 8/183; 427/393.3
[58] Field of Search ................. 8/183; 427/393, 393.3

[56] References Cited

U.S. PATENT DOCUMENTS

| | | | |
|---|---|---|---|
| 3,956,243 | 5/1976 | Loss et al. | 8/183 X |
| 4,092,108 | 5/1978 | Valko et al. | 427/393.3 X |
| 4,095,945 | 6/1978 | Umetani et al. | 427/393.3 X |
| 4,154,890 | 5/1979 | Wagner | 427/337 X |
| 4,166,897 | 9/1979 | Umetani et al. | 427/393.3 X |
| 4,585,703 | 4/1986 | Taguchi et al. | 427/393.3 X |
| 4,741,971 | 5/1988 | Beck et al. | 427/393.3 X |

FOREIGN PATENT DOCUMENTS 761195 9/1954 United Kingdom .

*Primary Examiner*—Michael Lusignan
*Attorney, Agent, or Firm*—Frishauf, Holtz, Goodman & Woodward

[57] ABSTRACT

Compositions for flame proofing wood e.g. in the form of aqueous solutions containing tetrakis (hydroxymethyl) phosphonium salt, methylolmelamine with at least 3.5 optionally alkylated hydroxymethyl groups per melamine nucleus, a polyfunctional nitrogen compound with at least 2 N-H groups e.g. urea and a base e.g. triethanolamine.

17 Claims, No Drawings

WOOD TREATMENT COMPOSITION AND PROCESS

This application is a continuation of application Ser. No. 07,426,534, filed Oct. 24, 1989 (abandoned); which is a continuation of Ser. No. 07,320,862 filed Mar. 6,1989 (abandoned); which is a continuation of Ser. No. 07,150,015 filed Jan. 29, 1988 (abandoned).

BACKGROUND INFORMATION

1. Field of the Invention

This invention relates to compositions and processes for the treatment of wood in particular to render it fire retardant.

2. Background Information

In British Patent 761195 is described a process for flame proofing wood which comprises impregnating it with a solution of a tetrakis(hydroxymethyl) phosphonium (hereinafter called THP) salt and a polyfunctional organic nitrogen containing compound (or partially polymerized reaction product thereof) and further polymerizing it. Examples of the polyfunctional compound are urea and melamine and their methylolated and alkylated methylolated derivatives and use of urea, trimethylolmelamine and a partially methylated methylol melamine (product BT 309 of British Industrial Plastics) are exemplified. The pH of the impregnant solution may be adjusted with a carbonate or triethanolamine, which may also act as a catalyst, as may an acid. We have discovered that once an impregnant solution from a THP salt, urea, triethanolamine and partially methylated trimethylolmelamine has been prepared, it does not have a long life time because on standing it sets. This premature setting is a major problem because it reduces the lifetime of the impregnation bath liquid and hence the amount of wood that can be treated with that amount of liquid.

SUMMARY OF THE INVENTION

We have discovered how to increase the stability of the impregnant solution by use of special optionally alkylated methylol melamines.

The present invention provides a composition for treating wood to render it flame retardant which comprises a THP compound and a triazine compound which is an optionally partially alkylated methylolmelamine, with a cure time as hereinafter defined of at least 40 minutes at 70° C., or with an average of 3.5–6 optionally alkylated hydroxy methyl groups per triazine nucleus, a polyfunctional nitrogen containing compound with at least 2 N—H groups e.g. urea and a base eg organic base such as triethanolamine.

The present invention also provides a solution of that composition in water. There is also provided a process for treating a wooden substrate, which is wood or a product derived therefrom, which comprises impregnating it with said solution and then drying the impregnated substrate e.g. to effect polymerization.

DETAILED DESCRIPTION OF THE INVENTION

The THP compound is usually a salt e.g. with a strong acid such as a mono or di basic acid such as THP chloride or sulphate, or with a weak acid e.g. an organic carboxylic acid such as THP acetate and formate. A THP phosphate or mixtures of THP salts may be used but are preferably absent. The THP compound may also be at least partially neutralized THP salt, such as THP "hydroxide" or tris(hydroxymethyl) phosphine oxide. The THP compound may also contain a small amount of free formaldehyde. The compound contains 4 - hydroxymethyl groups per P atom and has not been condensed with any nitrogen compound or substantially with itself.

The optionally partially alkylated methylolmelamine has a 1,3,5 triazine nucleus and three amino groups in the 2,3,6 position usually carrying an average of 3.5–6 and especially 4–5.5 hydroxymethyl groups, and these hydroxymethyl groups can be at least partially in the form of their alkyl ethers. The triazine usually has a cure time of at least 40 minutes at 70° C., which was determined in the following way. To 20 g of an aqueous solution of the triazine containing 80% reactive solids in a vessel was added 0.8 g of a 50% by weight aqueous solution of zinc nitrate hexahydrate with stirring until a clear solution was obtained and then the solution in the vessel was kept at 70° C. by means of a thermostated bath until such time (hereafter called the cure time) as curing had occurred to the extent that the cured material completely resisted any stirring motion with a metal spatula. The initial pH of the clear solution is usually 5.8–6.2. If needed, the pH of the aqueous solution of triazine or the clear solution can be adjusted by addition of nitric acid or sodium hydroxide so that the final pH of the clear solution is 5.8–6.2. The cure time at 70° C. is usually 40 minutes to 10 hours, e.g. 40 minutes to 6 hours, such as 40–200 or 40–140 and especially 40–75 minutes or 70–140 minutes. In the triazine at least some of the hydroxymethyl groups have preferably been etherified e.g. to an extent of 10–100% and especially 30–80% or 30–60% with alkyl groups e.g. of 1–10 such as 1–5 carbons atoms e.g. methyl, ethyl or butyl groups. The degree of etherification is usually higher with increasing numbers of hydroxymethyl groups per triazine nucleus. Thus with an average of 4.5–5.5 hydroxymethyl groups the degree of alkylation can be 30–60% and with an average of 5.5–6 groups the degree may be 60–90%. The triazine may contain an average of 3.5–6 preferably 4–5.5 in total of alkoxymethyl and hydroxymethyl groups per molecule, an average of 0.1–4 such as 0.5–2 or 1–3.5 and especially 1.5–3.5 hydroxymethyl groups per molecule and an average of 1–5.9 such as 4–6 or 1.5–5 preferably 1.5–3.5 alkoxymethyl groups per molecule. The number of hydroxymethyl groups per triazine nucleus, and the degree to which they have been etherified are usually based on the number of moles of formaldelyde and alcohol respectively used in the process of their production, but may also be determined by physical or chemical methods of analysis. The etherification may be performed by reacting the hydroxymethyl melamine with the appropriate alkanol in the presence of an acid catalyst. The triazine compound is preferably in the form of the monomeric material but may also to a minor extent to be also in the form of low molecular weight self condensates of the monomer; preferably the compound is in the form of 55–100% e.g. 70–90% monomer and 45–0% e.g. 30–10% of the self condensate. Examples of commercially available optionally partially alkylated methylolmelamines are that sold as BT 370 by British Industrial Plastics with a cure time at 70° C. found to be 264 minutes and partially methylated hexamethylolmelamines such as Cibamin ML1000 GB sold by Ciba Geigy with a cure time at 70° C. found to be 290 minutes, but preferably the partially methylated methylolmelamine is such as is sold as BT 336 by British Industrial Plastics with a cure time of 70° C. found to be 50 minutes, or as is sold as Lyofix CH by Ciba Geigy with a cure time at 70° C. found to be 108 minutes.

The polyfunctional nitrogen containing compound with at least 2 N—H groups, preferably at least 1 and especially 2 NH$_2$ groups is usually one capable of reacting with the THP compound and/or triazine compound in aqueous solutions and usually one which in aqueous solution swells the wood. The polyfunctional compound is different from the triazine compound and is usually non cyclic and free of methylol groups as in urea formaldehyde condensates which are preferably absent. Examples of suitable compounds are urea which is preferred, guanidine, biuret, cyanamide, dicyandiamide and semi carbazide.

The composition is usually one which in aqueous solution e.g. at 20–60% especially 52% solids content has a pH of 4–8.5 especially 6–7.5. The solution is usually at pH 4–8.5 e.g. 5.0–7.5, particularly 6.0 to 7.2 and especially 6.5–7. The less acid the pH the higher the stability of the impregnation bath but the slower the subsequent cure of the impregnated wood. The desired pH of the solution is usually achieved by adding the THP compound as salt, adjusting its pH by addition of base usually an alkali metal hydroxide, carbonate, bicarbonate or a phosphate such as dialkalimetal phosphate and/or an organic tertiary amine such as an optionally hydroxyl substituted trialkylamine with 3–12 carbon atoms and 0–3 especially 3 hydroxyl groups, such as triethylamine, tripropanolamine and especially triethanolamine. Preferably a base capable of forming a buffer in the solution is used, such as the phosphate salt or organic amine. The amount of base is usually sufficient to give the desired pH, but different amounts may be needed even with constant amounts of the other ingredients due to variations in the pH of the THP compounds. Conveniently the impregnant solutions of the invention are made by mixing the THP salt and the base in solution, and then mixing with a solution of the triazine compound and urea. Thus the solutions may be made by mixing at least some and preferably all the contents of two packs, a first pack containing the salt and base, and a second pack containing the triazine compound and urea; such two component packs constitute another aspect of the invention.

The compositions of the invention can contain 1–15 parts e.g. 6–15 parts such as 6–12 parts of the triazine compound, 2–20 parts e.g. 5–15 parts and especially 7–11 parts of urea (or equivalent amounts of other polyfunctional N compound), 10–30 parts e.g. 15–25 parts of THP compound especially THP chloride, or equivalent amount of other THP salts, and 2–30 parts e.g. 5–18 parts and especially 10–18 parts of triethanolamine (or equivalent amount of another base). Advantageously these are the numbers of parts of each of the ingredients present in 100 parts of the solutions of the invention so that the parts are then percentage contents of the solutions. Preferably the triazine, urea, THP compound and triethanolamine are in the weight ratios of 1–15:10–30:2–20:2–30 especially 6–15: 5–15: 15–25: 5–18. Expressed on the basis of the dry weight total of THP salt, triethanolamine, urea and triazine compound, the solution may contain 5–30% e.g. 10–30% and especially 20–30% of triethanolamine (or equivalent amount of another base), 5–30% e.g. 10–25% and especially 15–25% urea, 5–30% e.g. 10–27% and especially 15–25% of triazine compound and 30–50% e.g. 30–40% and especially about 35% of THP group in the THP compound. Expressed in relation to the total of THP group, urea and triazine compound only (ignoring the water and base) the solutions may contain 6–30% e.g. 13–30% and especially 17–25% of urea, 6–35% e.g. 15–35% and especially 20–30% of triazine compound and 35–75% e.g. 40–65% and especially 45–55% of THP group. Thus solutions may contain for each 22 parts of THP chloride (or corresponding amounts of other THP compounds) 2–16, e.g. 5–16 and especially 9–16 parts of triethanol amine (or equivalent amount of another base), 2–14, e.g. 5–14 and especially 8–12 parts of urea and 2–14, e.g. 6–12 parts of triazine and usually 45–75 such as 55–65 parts of water. Thus weight proportions of THP group to the triazine compound are usually 1:0.1–1 e.g. 1:0.2–0.8 such as 1:0.3–0.6, weight proportions of THP group to urea (or equivalents of other polyfunctional compounds) are usually 1:0.1–1 e.g. 1:0.2–0.8 such as 1:0.3–0.6, and weight proportions of THP group to triethanolamine (or equivalents of other bases) are usually 1:0.1–1 e.g. 1:0.2–0.9 such as 1:0.5–0.9.

The solutions of the invention are usually made up just before use and then preferably stored at ambient temperature or lower e.g. 0°–30° C. and especially 0°–20° C.; the lower the storage or use temperature the higher the stability of the bath.

The solutions of the invention usually have a total solids content of 15–90% e.g. 30–75% and especially 40–70% such as 40–60%. The final solution is desirably prepared in a concentrate form until it is about to be used to impregnate the wood, when it is usually diluted with water. The solids content of the impregnant solution is usually 1–60% e.g. 2–30% such as 2–15% or 5–10%.

The wood substrate which is to be rendered flame retardant may be cut or sawn timber or lumber, in particular soft woods such as pine, cypress, red cedar or fir or hard wood such as oak, e.g. in the form of posts, slats, boards, beams or shingles, or may be wood products derived therefrom with a significant portion of the original wood fibrous structure intact, as in rigid or semi rigid particle boards formed by pressing (and optionally resin coating) such as plywood, chipboard, hardboard and blockboard, but not paper or cardboard. If desired the wood products may be treated with the solutions of the invention before pressing. The wood substrate may be of thickness 0.05–10 cm e.g. 0.2–10 cm but preferably is of 0.2–2 cm.

Application to the wood (including products derived therefrom) may be accomplished in a number of ways. The solutions of the invention may be applied by soaking or painting the wood (or product derived therefrom) to be treated in the solution until such time as sufficient absorption has been reached. However, the solutions are preferably applied by vacuum and/or pressure impregnation techniques designed to ensure that the solutions are absorbed fully into the substrate. Thus the cellulosic substrate may be contacted with aqueous solution, the pressure raised to above atmospheric with the material still contacting the system and the pressure returned to atmospheric, the pressures and time for which the pressure is maintained being sufficient to result in the desired loading. Preferably the wood is subjected to a pressure lower than atmospheric before or after contacting with the aqueous solution or both. For example, the substrate may be placed in a chamber, the pressure in the chamber reduced, impregnation solution, usually at room temperature, added to cover the substrate, the pressure increased to greater than atmospheric, maintained there and then reduced to atmospheric and the solution drained from the chamber, followed, optionally, with a short period of reduced pressure. Alternatively, the initial pressure reduction can be omitted. Techniques with and without initial pressure reduction are known as Full cell and Empty cell techniques and are described in "The Preservation of Timber" by W. P. K. Findley, publ. Black 1962 pp 36–41 and "Wood Preservation" by G. M. Hunt and G. A. Garratt, 3rd Ed. American Forestry Series, McGraw-Hill, 1967.

The concentration of triazine compound, THP compound and urea in the aqueous system, the size of the pressures, the time of maintenance of the super-and sub-atmospheric pressures and the nature of the wood material, affect the loading on the material. Thus increasing the concentration, or the super-atmospheric pressure, the time of maintenance at super-atmospheric pressures produces an increase in the loading of active ingredients on the material. Changing the substrate for one having a higher ease of absorption results in an increasing in the loading as does treatment of a cellulosic material of small cross sectional area. Loadings on the substrate expressed in terms of weight of total solids from the solution loaded onto one cubic meter of substrate may vary from 10–2000 kg/m$^3$, depending on the substrate and the degree of flame proofing sought. The loading figures quoted are in respect of solids retained on the wood after the impregnation and drying to the wood's original moisture content e.g. 7%.

Examples of loadings for edge grained heartwood Western Red Cedar e.g. in the form of shingles are 10–400 kg/m$^3$; preferred amounts are 10–30 kg/m$^3$, or 30–50 kg/m$^3$ or 50–300 kg/m$^3$ (especially 60–200 kg/m$^3$) giving respectively Class 3, 2 or 1 fire retardance protection to the surface spread of flame according to the BS 476 part 7 small scale test (1971). Expressed in terms of the weight of THP group from the solution per m$^3$ of substrate, the loadings one third of the above figures and expressed in terms of the weight of phosphorus per m$^3$ of substrate, the loadings are one tenth of the above figures. Generally vacuum pressure times of five minutes to two hours, usually 5–30 or 12–30 minutes, are used with vacua of less than 0.5 bar (5000 kg/m$^2$) such as 0.05–0.4 bar (500–4000 kg/m$^2$). Super-atmospheric pressures of 2 to 20 bar e.g. 5–15 bar (20,000 to 200,000 e.g. 50,000 to 150,000 kg/m$^2$) for times of 10 hours to 5 minutes e.g. 5 hours to 10 or 20 minutes, e.g. 2 hours to 30 minutes are convenient, the longer times applying to use of lower pressures and longer times being needed for less absorbent wood than more absorbent wood. The vacuum pressure and times used if at all after the super atmospheric pressures are within the ranges quoted for use before the super atmospheric pressure treatment.

Once the substrate, i.e. wood (or product derived therefrom) has been impregnated with the solution of the invention, the substrate is usually dried until its moisture content has returned to about the same as in untreated substrate e.g. 2–25% moisture content. The drying may be by heating at 50°–100° C. and 25–95% e.g. 25–75% or 50–95% Relative Humidity preferably to constant weight, though drying at 15°–30° C. e.g. 20°–25° C. usually at 20–60% Relative Humidity may be used e.g. over 0.5–2 months. A programmed drying starting at 50°–80° C. and 50–95% RH and ending with 60°–85° C. and 25–50% RH is preferred. In order to fix the THP compound and triazine compound better and increase the resistance of the treated wood to leaching, the dried substrate can be cured e.g. with ammonia or especially by heating. The curing may be by impregnation with aqueous or liquid ammonia, especially when the formulation is at pH 7–8 e.g. using the impregnation techniques described above, but care should be taken to minimize leaching of the impregnant chemicals back into the ammonia, thereby reducing the flame retardance of the substrate. Thus preferably the substrate is contacted only with sufficient aqueous or liquid ammonia as will be absorbed by it.

After or instead of a drying regime as described above, the substrate can be heat cured instead of ammonia cured by heating at 100°–180° C. e.g. 100° to 150° C. for 10 minutes to 2 hours, e.g. at 100° to 130° C. for 15–70 minutes. During the heat cure the Relative Humidity can be kept at 50–95% to control the moisture gradient in the wood to minimise distortion or the wood can be reconditioned after the drying or curing to give its original moisture content. The heat curing is believed to cross link the THP compound, urea and the triazine compound to each other and also to the hydroxyl groups on the cellulose substrate and can result in a reduction in the amount of phosphorus values extracted from cured rather than ambient temperature dried wood. After the heat curing the wood is allowed to cool. The heat curing is preferably performed without any added ammonia or ammonium salts or added accelerators for melamine formaldehyde resin curing such as ammonium salts or tertiary amine salts or metal salts giving acid solutions in water such as those divalent metals with strong acids e.g. zinc nitrate or magnesium chloride. Preferably the drying and heat curing are performed together at 50°–100° C. and 25–95% RH as described above, especially in the programmed drying regime mentioned.

The impregnated cured wood has a higher fire retardance than the untreated wood and may be less susceptible to attack by wood rotting fungi. Compared to wood treated with ammonium phosphate fire retardant, the treated wood of the invention suffers very much less loss of fire retardant activity on prolonged leaching.

The invention is illustrated in the following Examples in which triazines A–E are as follows: All the products are commercial ones which are aqueous solutions of partially methylated methylol melamines. Triazines A, C and E were obtained from British Industrial Plastics of Birmingham, England, as products designated BT 336, 370 and 309. Triazines B and D were obtained from Ciba-Geigy, Duxford, England as products designated Lyofix CH and Cibamin ML 1000 GB respectively.

| Triazine | % Reactive solids in solution | Cure Time min. | Average Total Numbers ROCH$_2$ groups per molecule | Number of HOCH$_2$ groups | Number of CH$_3$OCH$_2$ groups |
|---|---|---|---|---|---|
| A | 80 | 50 | | | |
| B | 85 | 108 | 5 | about 3 | about 2 |
| C | 100 | 264 | | | |
| D | 95 | 290 | 6 | about 1.5 | about 4.5 |
| E | 90 | 23 | | | |

The cure time was determined at 70° C. as described above without adjustment of pH, the initial pH values of the clear solution being 5.8–6.2 for triazines A, B and E, 4.8 for triazine C and 5.6 for triazine D.

The total number of hydroxymethyl and methoxymethyl groups is derived from the number of formaldehyde units per triazine molecule used to make the compound, and it (and the split between hydroxy-and methoxymethyl groups) are given on the assumption that there has been no self condensation.

EXAMPLE 1 and Comparative Example A

In respect of each of triazines A-E, two solutions 1 and 2 were made up separately. Solution 1 contained 28 parts of an 80% aqueous solution of THP chloride (which has a pH of about less than 0), 20 parts of water and 12 parts of triethanolamine. Solution 2 contained 31.5 parts of water, 9 parts of urea and 11.5 parts of the triazine. Solutions 1 and 2 were mixed to give impregnant solutions of pH 6.8, which were kept at 25° C. and the time taken for them to go cloudy and gel was recorded.

The results were as follows.

| Example | Triazine | Time in days for Cloudiness | Gelation |
|---|---|---|---|
| 1 | A | 10 | 12 |
| 2 | B | 10 | 10-14 |
| 3 | C | 14 | 15-16 |
| 4 | D | 14 | 17 |
| Comp. A | E | 7 | 8 |

In addition with Triazine C only the mixing of solutions 1 and 2 resulted in immediate cloudiness, which resulted in a clear liquor above a small amount of white precipitate. The clear liquor then remained clear until the onset of permanent cloudiness after 14 days.

EXAMPLES 5-9

Solutions as in Example 1, but with variable amounts of triethanolamine, were prepared and their stability determined. In these cases the solutions were not kept at constant temperature but were kept together in a laboratory at ambient temperature. For each impregnation liquor the pH was measured and the gel time determined.

The results were as follows:

| Ex | Parts Triethanolamine | pH | Gel Time Days |
|---|---|---|---|
| 5 | 15 | 7 | 13 |
| 6 | 11.5 | 6.7-6.8 | 11 |
| 7 | 9 | 6.6 | 7-10 |
| 8 | 6 | 6.4 | 7-10 |
| 9 | 3 | 5.7 | 5 |

EXAMPLE 10-12

Solutions as in Ex. 8, but with various amounts of urea were prepared and their stability determined at ambient temperature as in Ex. 8.

The results were as follows:

| Ex | Parts urea | pH | Gel Time Days |
|---|---|---|---|
| 10 | 12 | 5.6 | 10 |
| 11 | 9 | 5.6 | 10 |
| 12 | 6 | 5.5 | 14 |

EXAMPLES 13-17

Solutions as in Ex. 8, but with variable amounts of triazine A were prepared and their pH and stability determined at ambient temperature as in Ex. 8.

The results were as follows:

| Ex | Parts triazine A | pH | Gel Time Days |
|---|---|---|---|
| 13 | 15 | 5.9 | 8 |
| 14 | 11.5 | 5.6 | 8 |
| 15 | 9 | 5.8 | 8 |
| 16 | 6 | 5.9 | 9 |
| 17 | 3 | 5.9 | 9 |

EXAMPLE 18

5 separate solutions as in Ex. 1 were prepared and kept at different temperatures to determine their stabilities under different conditions.

The results were as follows:

| Temperature °C. | Gel Time Days |
|---|---|
| 40 | 1.5 |
| 25 | 12 |
| ambient indoors | 14 |
| ambient outdoors (summer) | 21-25 |
| 15 | 40-42 |

EXAMPLES 19-22

Three more impregnation solutions of Example 1 were made as in Example 1 and then diluted with amounts of water which were respectively one third, equal and three times the weight of the impregnation solution to give solutions 20, 21 and 22 respectively.

The four solutions (impregnation solution 1 and solutions 20-22) of relative concentrations 4:3:2:1 obtained were separately impregnated into wood and the flame retardancy of the wood determined. The procedure was as follows. Western Red Cedar Timber 100% edge grain, 100% hardwood wedge shaped shingles (sold as No. 1 grade Blue Label Centigrade xxxxx shingles by John Brash and Co. Gainsborough, England) of 40×10-30×average 0.5 cm size and of 7% moisture content were subjected to the full cell impregnation technique by evacuation of the shingles in an impregnation vessel at 0.2 bar (2000 kg/m$^2$) (ie 0.8 Bar vacuum) for 15 mins, covering of the shingles with the solution followed by 1 hour pressure of 12 bar (120,000 kg/m$^2$), draining of the liquid from the vessel, evacuation of the shingle for 15 mins at 0.2 bar (2000 kg/m$^2$) and then draining of the liquid from the vessel. The shingles were then dried in air at 20°-25° C. and 30-40% RH for 1 month, after which time their moisture content had returned to about 7%. From the sizes of the shingles and their gain in weight, the retentions of chemicals from the solutions were calculated for each shingle. The shingles were also tested for surface flame retardancy according to the Small Scale Surface spread of flame test of BS 476 part 7 (1971).

The results were as follows:

| Example | Impregnation Solution | Average Retention of Chemicals kg/M$^3$ | BS 476 Pt 7 Test Class |
|---|---|---|---|
| 19 | 1 | 186 | 1 |

-continued

| Example | Impregnation Solution | Average Retention of Chemicals kg/M³ | BS 476 Pt 7 Test Class |
|---|---|---|---|
| 20 | 20 | 148 | 1 |
| 21 | 21 | 102 | 1 |
| 22 | 22 | 64 | 1-2 |

EXAMPLE 23

The process of Example 22 was repeated with replacement of the full cell impregnation technique by simple total immersion of the shingle in the impregnation solution 22 for 1.5 hours. The chemical retention was 17 kg/m³ and the flame retardancy was Class 3.

EXAMPLE 24

The process of Example 19 was repeated with replacement of the full cell impregnation technique by brush coating of the solution 1 into the shingle to saturation. The chemical retention was about 53 kg/m³ and the flame retardancy was Class 2.

EXAMPLE 25

An impregnant solution as in Example 1 was prepared and diluted further with water in the ratio of 15 parts of Example 1 solution to 85 parts of water. The process of Example 19 was repeated with this diluted solution and with a programmed drying regime, in which the impregnated shingles were submitted to heating starting at 60° C. and 70% RH and ending at 75° C. and 30% RH over 7 days. The drying also is believed to have resulted in some curing of THP compound. The average retention of the chemicals was 40 kg/m³ and the THP treated shingles were graded Class 2 in the flame test BS 476 Part 7 (1971) and Class C in a flame test similar to the US burning brand test ASTM 108/58.

Compared to the untreated shingles, the treated shingles had substantially the same bending strength, impact resistance and hardness. Shingles treated with commercial ammonium phosphate fire retardant after leaching with water in a Soxhlet apparatus for 24 hour suffered a 75% loss in phosphorus content (cf a 16% loss in P content suffered with the above THP treated shingles).

We claim:

1. A process for treating a material comprising wood to render the material flame-retardant, said process comprising
    (a) impregnating said material comprising wood with a composition comprising
        (i) from 10 to 30 parts by weight of a tetrakis (hydroxymethyl) phosphonium compound;
        (ii) from 1 to 15 parts by weights of a triazine compound selected from the group consisting of methylol melamines and partially-alkylated methylol melamines, said triazine compound (ii) having from 3.5 to 6 hydroxymethyl groups per triazine nucleus and having a cure-time of 40 minutes or greater at 70° C.;
        (iii) from 2 to 20 parts by weight of a polyfunctional nitrogen-containing compound having at least two N-H groups;
        (iv) a base, said composition being dissolved in water and at a 52% total solids concentrate yields an aqueous solution having a pH of 5 to 7.5 and
    (b) drying said impregnated material comprising wood.

2. The process of claim 1 wherein said base (iv) is present in an amount of 2 to 30 parts by weight.

3. The process of claim 1 wherein said base (iv) is a tertiary organic base.

4. The process of claim 1 wherein said nitrogen-containing compound (iii) is urea and said base (iv is triethanolamine.

5. The process of claim 1, wherein said composition comprises:
    (i) 22 parts of tetrakis (hydroxymethyl) phosphonium chloride;
    (ii) from 6 to 12 parts of said triazine compound;
    (iii) from 5 to 14 parts of urea; and
    (iv) from 9 to 16 parts of triethanolamine.

6. The process of claim 5, wherein said triazine compound (ii) has from 4.5 to 5 partially-alkylated hydroxymethyl groups per triazine nucleus.

7. The process of claim 5, wherein said triazine compound (ii) has a cure time of from 40 to 140 minutes.

8. The process of claim 7, wherein said triazine compound (ii) has a cure time of from 40 to 75 minutes.

9. The process of claim 5, wherein said triazine compound (ii) has 4.5 to 5 partially-alkylated hydroxymethyl groups per triazine nucleus and has a cure time of 40 to 75 minutes.

10. The process of claim 5, wherein the composition comprises 8 to 12 parts of urea.

11. The process of claim 5, wherein the composition comprises 45 to 75 parts of water.

12. The process of claim 5, wherein said the composition comprises 55 to 65 parts of water.

13. The process of claim 1, wherein said wood material is selected from the group consisting of timber, lumber, particle board, plywood, chipboard, hardboard and blockboard.

14. The process of claim 13, wherein said composition is loaded on said material at a loading of 10 to 2000 kg of total solids per cubic meter of material.

15. The process of claim 14, wherein said drying is conducted to dry said material to a moisture content of 2 to 25%.

16. The process of claim 15, wherein said tetrakis (hydroxymethyl) phosphonium compound (i) is tetrakis (hydroxymethyl) phosphonium chloride, said polyfunctional nitrogen-containing compound (iii) is urea and said base (iv) is triethanolamine.

17. The process of claim 14, wherein further comprises conducting curing and said curing and drying being carried at a temperature of 50° C. to 100° C.

* * * * *